(12) United States Patent
Burns et al.

(10) Patent No.: US 8,302,034 B2
(45) Date of Patent: Oct. 30, 2012

(54) PERFORMING OPTICAL PROXIMITY CORRECTION BY INCORPORATING CRITICAL DIMENSION CORRECTION

(75) Inventors: Ryan L. Burns, Hopewell Junction, NY (US); Sean D. Burns, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 12/697,556

(22) Filed: Feb. 1, 2010

(65) Prior Publication Data

US 2010/0199256 A1    Aug. 5, 2010

Related U.S. Application Data

(60) Provisional application No. 61/149,448, filed on Feb. 3, 2009.

(51) Int. Cl.
*G06F 17/50* (2006.01)

(52) U.S. Cl. ...................................... 716/53

(58) Field of Classification Search ................ 716/51, 716/53, 55
See application file for complete search history.

(56) References Cited

U.S. PATENT DOCUMENTS

2010/0095264 A1 * 4/2010 Huang et al. .................... 716/19

* cited by examiner

*Primary Examiner* — Vuthe Siek
(74) *Attorney, Agent, or Firm* — Wenjie Li; Hoffman Warnick LLC

(57) ABSTRACT

A solution for performing an optical proximity correction (OPC) process on a layout by incorporating a critical dimension (CD) correction is provided. A method may include separating the layout into a first portion and a second portion corresponding to the two exposures; creating a model for calculating a CD correction for a site on the first portion, the model corresponding to a topography change on the site due to the double exposures; implementing an OPC iteration for the fragment based on the model to generate an OPC solution for the first portion; and combining the OPC solution for the first portion with an OPC solution for the second portion to generate an OPC solution for the layout to generate a mask for fabricating a structure using the layout.

17 Claims, 5 Drawing Sheets

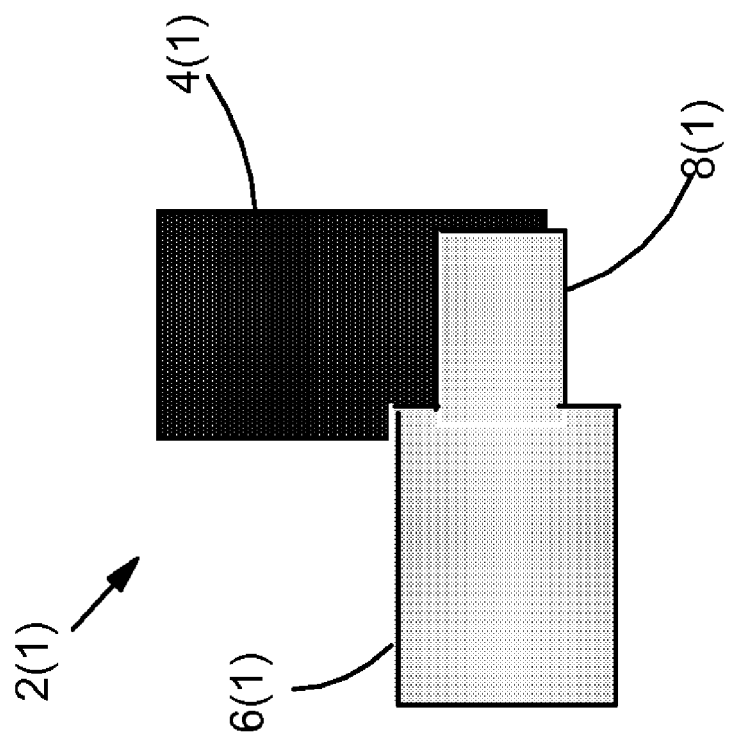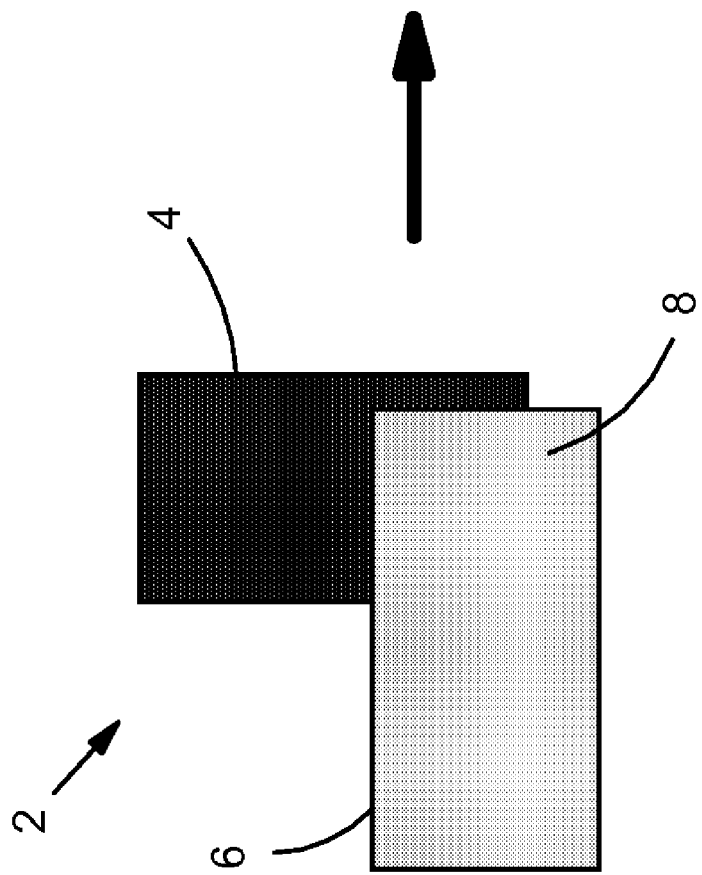

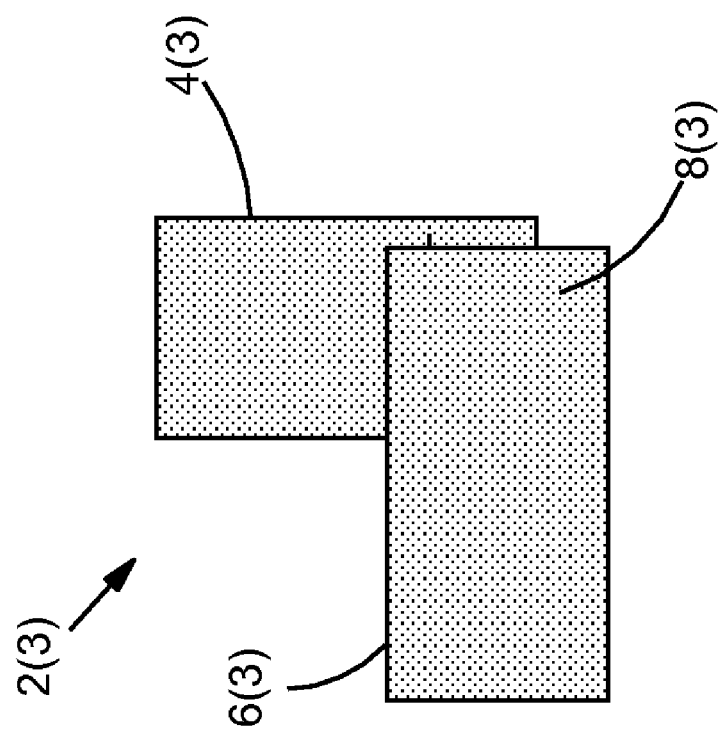
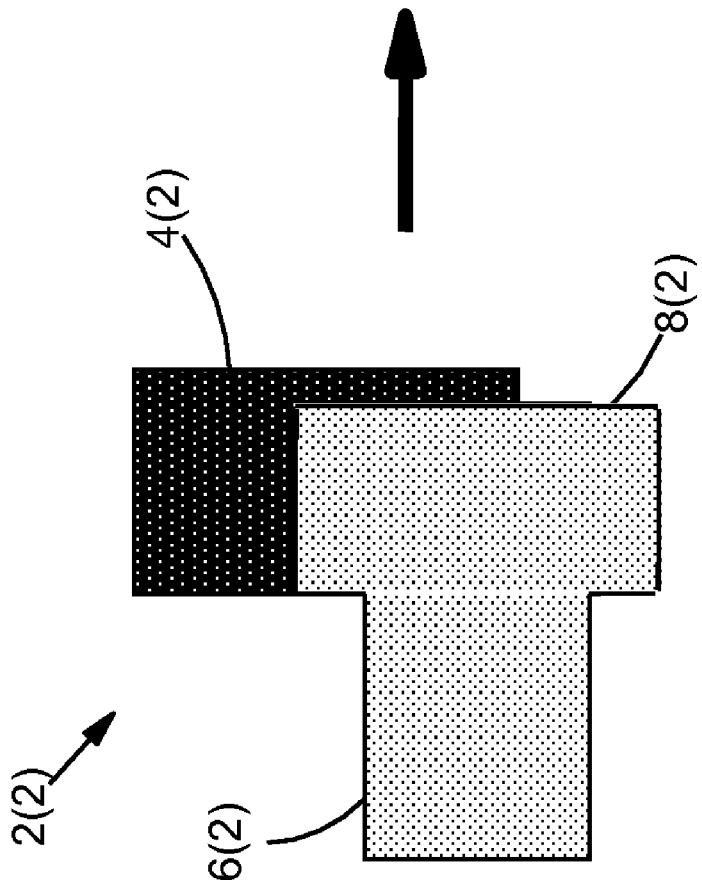
FIG. 4

PERFORMING OPTICAL PROXIMITY CORRECTION BY INCORPORATING CRITICAL DIMENSION CORRECTION

This non-provisional application claims the benefit of the provisional application filed with the United States Patent and Trademark Office as Ser. No. 61/149,448 entitled "Performing Optical Proximity Correction By Incorporating Critical Dimension Correction", filed Feb. 3, 2009.

BACKGROUND

1. Technical Field

This disclosure relates generally to integrated circuit layout, and more particularly to data correcting an integrated circuit layout incorporating a critical dimension (CD) correction.

2. Background Art

Double patterning has become a primary solution to continually decrease resolution as the limits of optical lithography are reached. However, several technical issues need to be addressed with double patterning. For the case of "photoresist on photoresist" double patterning, where the first pattern and the second pattern have intersecting areas, the second resist will be required to image over topography. This may also be true for cases of double patterning that require the resist to be imaged on a pattern that has been previously etched. For many common designs it is required that the second resist prints with a single critical dimension (CD) in both thin regions and thick regions, as the second resist traverses topography of the first photoresist image. However, it is known that the CD will shift with resist thickness due to the "bulk" and/or "swing" effects, as well as focus variations. As shown in FIG. 1, designed layout 2 includes second pattern 6 intersect first pattern 4 in portion 8. Due to the bulk effect, the CD 6(1) as printed in resist of the second pattern is biased as portion 8(1) is narrower than the designed layout portion 8. FIG. 1 is merely one example of this effect. Depending upon the thickness change of the resist, the size and shape of the structures, and tone (positive or negative) of each structure, it is possible to have a wide variety of CD image distortions as the second resist traverses the topography of the first resist.

SUMMARY

A solution for performing an optical proximity correction (OPC) process on a layout by incorporating a critical dimension (CD) correction is provided. A method may include separating the layout into a first portion and a second portion corresponding to the two exposures; creating a model for calculating a CD correction for a site on the first portion, the model corresponding to a topography change on the site due to the double exposures; implementing an OPC iteration for the fragment based on the model to generate an OPC solution for the first portion; and combining the OPC solution for the first portion with an OPC solution for the second portion to generate an OPC solution for the layout to generate a mask for fabricating a structure using the layout.

A first aspect of the disclosure is directed to a method for performing an optical proximity correction (OPC) process on a layout by incorporating a critical dimension (CD) correction of a structure therein, the layout requiring double exposures in fabrication, the method comprising: separating the layout into a first portion and a second portion corresponding to the two exposures; creating a model for calculating a CD correction for a site on the first portion, the model corresponding to a topography change on the site due to the double exposures; implementing an OPC iteration for the fragment based on the model to generate an OPC solution for the first portion; and combining the OPC solution for the first portion with an OPC solution for the second portion to generate an OPC solution for the layout to generate a mask for fabricating a structure using the layout.

A second aspect of the disclosure is directed to a system for performing an optical proximity correction (OPC) process on a layout by incorporating a critical dimension (CD) correction of a structure therein, the layout requiring double exposures in fabrication, the system comprising: at least one computing device; means for separating the layout into a first portion and a second portion corresponding to the two exposures; means for creating a model for calculating a CD correction for a site on the first portion, the model corresponding to a topography change on the site due to the double exposures; means for implementing an OPC iteration for the fragment based on the model to generate an OPC solution for the first portion; and means for combining the OPC solution for the first portion with an OPC solution for the second portion to generate an OPC solution for the layout to generate a mask for fabricating a structure using the layout.

A third aspect of the disclosure is directed to A program product stored on a computer-readable medium, which when executed by a computer system, performs an optical proximity correction (OPC) process on a layout by incorporating a critical dimension (CD) correction of a structure therein, the layout requiring double exposures in fabrication, the program product performing the following process: separating the layout into a first portion and a second portion corresponding to the two exposures; creating a model for calculating a CD correction for a site on the first portion, the model corresponding to a topography change on the site due to the double exposures; implementing an OPC iteration for the fragment based on the model to generate an OPC solution for the first portion; and combining the OPC solution for the first portion with an OPC solution for the second portion to generate an OPC solution for the layout to generate a mask for fabricating a structure using the layout.

Other aspects and features of the present disclosure, as defined solely by the claims, will become apparent to those ordinarily skilled in the art upon review of the following non-limited detailed description of the disclosure in conjunction with the accompanying figures.

BRIEF DESCRIPTION OF THE DRAWINGS

FIG. 1 shows an example of a critical dimension (CD) error caused by two overlapping patterns where the $2^{nd}$ photoresist traverses topography as it is patterned over the $1^{st}$ photoresist feature.

FIG. 4 shows an example of a scheme for correcting a CD variation using a model for optical proximity correction.

DETAILED DESCRIPTION

Embodiments of this disclosure address the issues associated with double exposed structure by providing a fast and accurate approach to correct short range critical dimension (CD) variations caused by the double exposure process in an optical proximity correction (OPC) process by separating the structure design into two portions corresponding to the two exposures and implement separate OPC processes for the two portions. The resulting OPC solutions for the two portions will be combined. For the portion whose respective critical dimension (CD) will be affected by the double exposure process, a model will be generated to compensate for the CD variation over topography in the respective OPC process. In this disclosure, a short range CD variation refers to a CD variation of a specific OPC site/cell, which is contrary to a long range CD variation which represents a systematic impact of a process that affects the final wafer critical dimensions on scales larger than the optical radius in the lithography model.

Figure 2:
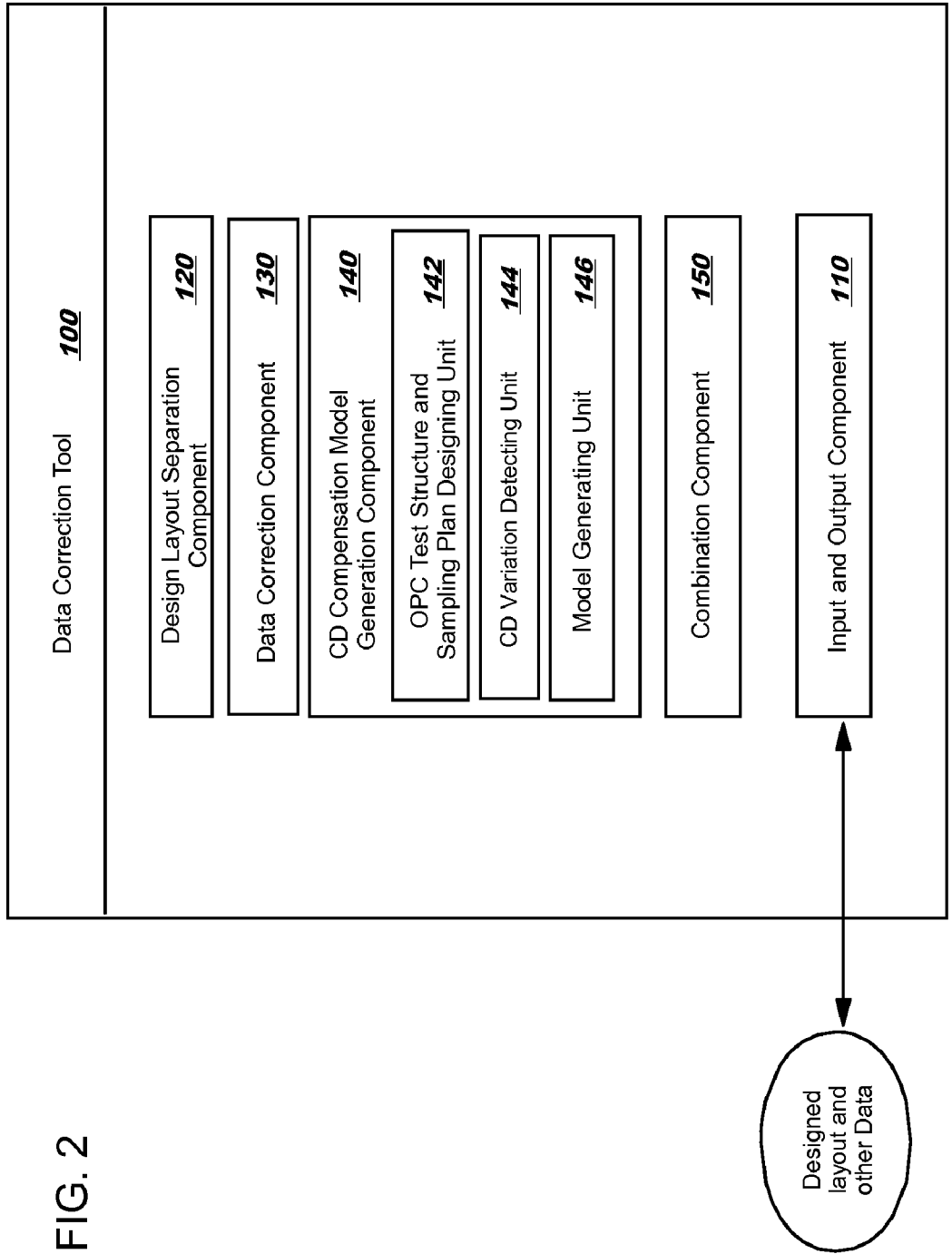
FIG. 2 shows a schematic block diagram of a data correction tool used to perform data correction on an IC layout.

FIG. 2 shows a schematic block diagram of a data correction tool 100 used to perform a data correction on a designed IC layout for an IC structure incorporating the compensation for a short range CD variation due to a double exposure process in the fabrication of the structure according to designed layout. Data correction tool 100 comprises an input/output component 110 configured to receive input and output data. In particular, input/output component 110 is configured to receive information on designed layout and other information, such as a density map, a CD compensation map, a tape-out process flow for manufacturing a structure based on designed layout, and/or user instructions as may be required in the operation of data correction tool 100. Input/output component 110 is also configured to output results from the data correction operation. These results can be used to, e.g., generate a mask for fabricating a device.

Data correction tool 100 further comprises a design layout separation component 120, a data correction component 130, a CD compensation model generation component 140, and a combination component 150. Design layout separation component 120 may be configured to separate a design layout into a first portion and a second portion corresponding to the double exposures required for processing the designed layout. The two exposures may be required by various situations. For example, the doubling patterning scheme may require two exposures, or the exposures of two consecutive layers may be taken as two exposures as the topography of a previous (lower) layer may affect the exposure of the immediately later (above) layer. The separation may be implemented using any technique.

Data correction component 130 may be configured to perform an OPC operation on design layout. Data correction component 130 may use/implement any now available or later developed OPC method. Further, data correction component 130 may be configured to perform iterative OPC movements determined by a model accommodating and/or compensating for CD variations.

CD compensation model generation component 140 may be configured to generate a model for the OPC that accommodate/compensate CD variation(s) on that image caused by the double exposures in the processing. Specifically, CD compensation model generation component 140 may further include an OPC test structure and sampling plan designing unit 142, a CD variation detecting unit 144 and model generating unit 146.

OPC test structure and sampling plan designing unit 142 may be configured to design one or more level(s) of OPC test structure(s) and sampling plan(s) based on, among others, the possible/relevant sources of CD variations in the double exposure process. For example, thickness of photoresist of a later exposure or a focus condition may be considered in determining the test structures and sampling plans. CD variation detecting unit 144 detects the CD variation caused by the two exposures in the process under the determined test structures and sampling plans. The detection may be implemented by any techniques, such as by simulation or actual measurement. Model generating unit 146 generates a model(s) for compensating/correcting the CD variation in the OPC process.

Combination component 150 may be configured to combine the OPC solutions, e.g., image shapes, of the two portions of the designed layout to generate an overall OPC solution for designed layout 10 to generate a mask for fabricating a structure.

Figure 3:
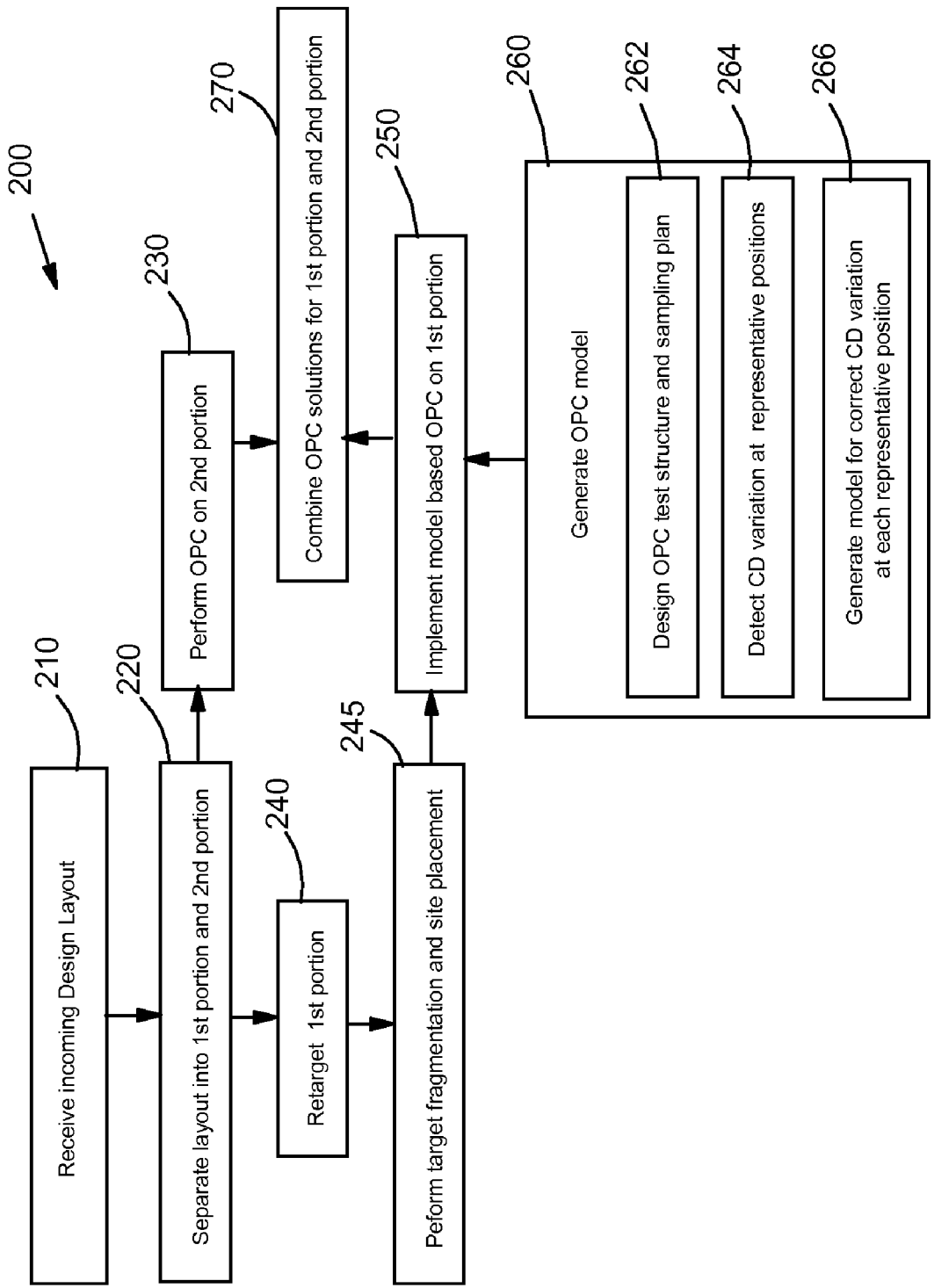
FIG. 3 shows a flow diagram of an example of an operation of the data correction tool of FIG. 2.

FIG. 3 shows an example of a flow chart 200 describing a data correction operation performed by data correction tool 100 on a design layout, which incorporates the compensation for a short range CD variation caused by double exposures in the fabrication process. The operation begins at process block 210 where data is provided to/received by input/output component 110. The required data may include the original design layout.

Next in FIG. 3 is the design layout separation process run at process block 220. Design layout separation component 120 may decompose the received design layout into a first portion and a second portion corresponding to the two exposures. According to an embodiment, the exposure of first portion is later than the exposure of the second portion such that the topography of the second portion affects the CD of the first portion.

In process block 230, data correction component 130 performs an OPC operation on the second portion to generate a corrected mask shape. Any known techniques can be used in the OPC operation of process 230.

In process block 240, retargeting process will be performed on the first portion. The retargeting may be preformed using any now available or later developed technique or scheme.

In process block 245, target fragmentation and site placement will be performed on retargeted first portion using any now available or later developed scheme.

In process block 250, data correction component 130 performs model based OPC iteration on each site (or OPC cell) on the first portion. That is, data correction component 130 conducts iterative OPC movements determined by a model based calculation of the site(s). As will be described in detail later, the model needs to accommodate compensation/correction of the potential CD variation caused by the double exposures. Process block 260 generates such models.

Process 260 includes three sub-processes. In sub-process block 262, OPC test structure and sampling plan designing unit 142 designs multiple level OPC test structures and sampling plans corresponding to multiple sources of CD variations. Each of the multiple sources of CD variations may cause topography changes in the printed image, and multiple CD variation sources may interact in causing the CD variations/topography changes. The CD variation sources may include thickness of photoresist, focus condition, or other general effects.

In process block 264, CD variation detecting unit 144 detects the CD variation/topography changes of an OPC site (determined at process block 245) at various representative positions under each level of test structures and sampling plans, each representative position indicating a possible combination of the influences of the various CD variation sources. The topography change at the site is then caused by the combination of the various sources in the two exposure processing. It should be appreciated that for each site on the first portion, there may be only one applicable representative position. However, for various sites on the first portion, the representative positions may be different. In addition, it is not necessary that multiple sources of CD changes are considered in process 260. That is, it is possible that only one source of CD variations (e.g., photoresist thickness) is considered where only one level of OPC test structures and sampling plans is needed in process 262 and the representative positions (process block 264) indicate the variation within the source, e.g., different photoresist thickness values.

In process block 266, model generating unit 146 generates a model for the OPC iterations in process 250 based on the detected topography changes/CD variations at the multiple representative positions. Multiple models need to be generated for the detected CD variation/topography changes at the multiple representative positions. Basically, each model is designed to compensate/correct the respective detected CD variation in the overall patterning process. For example, when a photoresist bulk/swing effect is to be corrected, CD changes due to different photoresist thickness values are detected and various models are created to correct the different CD variations due to the different photoresist thickness values. For another example, when a focus condition effect is to be corrected, CD changes due to various focus conditions are detected and various models are created for correcting the CD variations due to the various focus conditions.

For example, FIG. 4 shows a scheme for correcting the CD variation of FIG. 1. As shown in FIG. 1, when printed to the photoresist, image 6(1) includes a CD variation on intersection portion 8(1) due to the swing/bulk effect of the photoresist caused by the different photoresist thickness values on intersection portion 8 and other portion of pattern 6. When CD variation detecting unit 144 detects this CD variation, model generating unit 146 may correct this CD variation by bias portion 8 of feature 6 by widening portion 8 to an extent 8(2) that after the exposure with the bulk effect, the image on photoresist 8(3) matches portion 8 on design layout 2.

In process block 270, combination component 150 combines the OPC solutions for the first portion (process 250) and the OPC solution for the second portion (process 230) to generate an OPC solution for design layout 10. The combination may include addition or subtraction of OPC output shapes of the first portion and the second portion. Note that the boundary areas where two or more OPC shapes meet may be stitched together using any now available or later developed method.

The foregoing flow chart shows some of the processing functions associated with performing a data correction operation on an IC layout, which accommodates a compensation for short range CD variation(s) caused by double exposures. In this regard, each block represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added.

Figure 5:
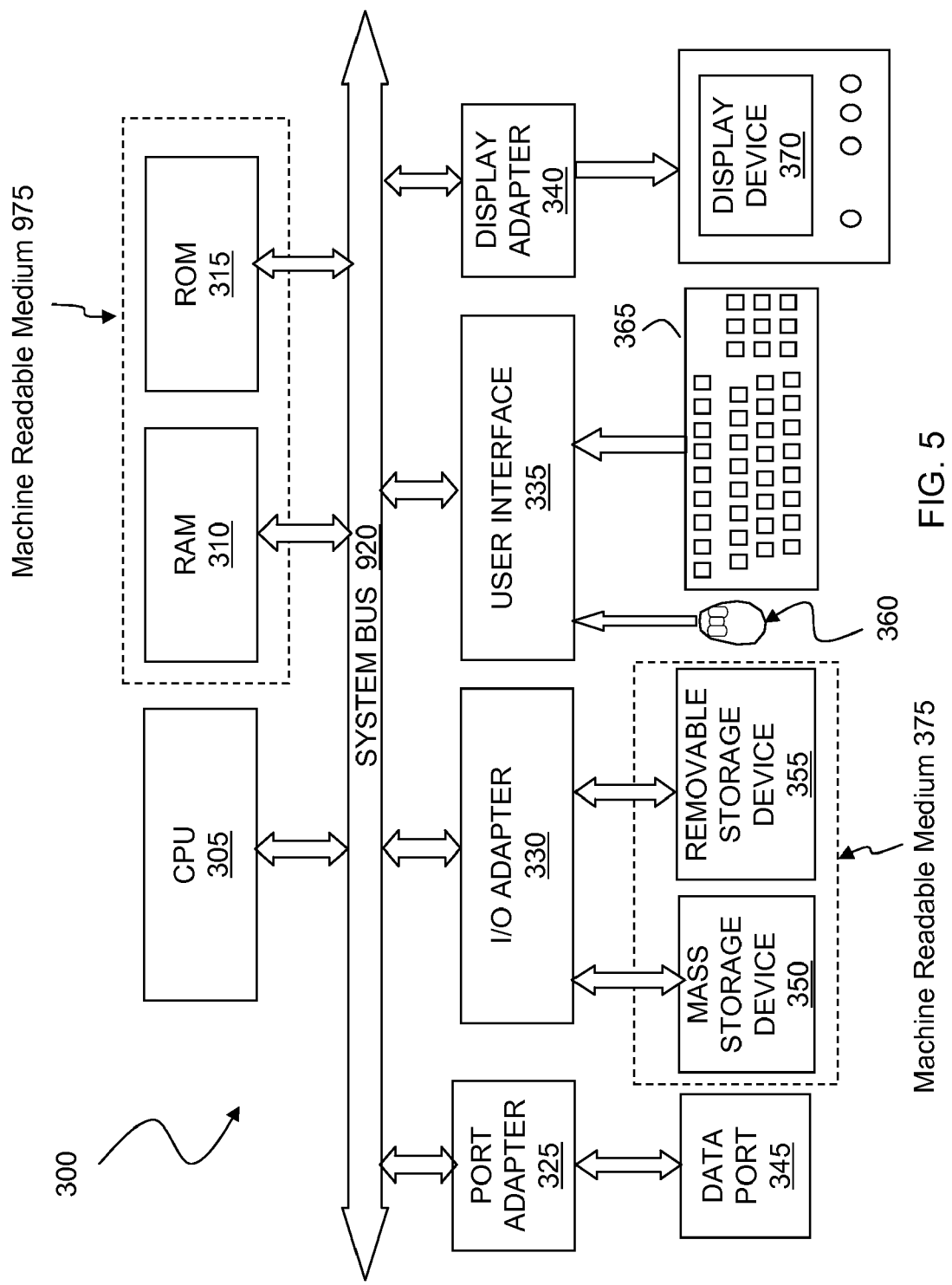
FIG. 5 shows a general computer system.

FIG. 5 depicts a block diagram of a general-purpose computer system 300 that can be used to implement data correction tool 100. Data correction tool 100 may be coded or deployed as a set of instructions on removable or hard media for use by the general-purpose computer 300. The computer system 300 has at least one microprocessor or central processing unit (CPU) 305. The CPU 305 is interconnected via a system bus 320 to machine readable media 375, which includes, for example, a random access memory (RAM) 310, a read-only memory (ROM) 315, a removable and/or program storage device 355, and a mass data and/or program storage device 350. An input/output (I/O) adapter 330 connects mass storage device 350 and removable storage device 355 to system bus 320. A user interface 335 connects a keyboard 365 and a mouse 360 to the system bus 320, a port adapter 325 connects a data port 345 to the system bus 320, and a display adapter 340 connects a display device 370 to the system bus 320. The ROM 315 contains the basic operating system for computer system 300. Examples of removable data and/or program storage device 355 include magnetic media such as floppy drives, tape drives, portable flash drives, zip drives, and optical media such as CD ROM or DVD drives. Examples of mass data and/or program storage device 350 include hard disk drives and non-volatile memory such as flash memory. In addition to the keyboard 365 and mouse 360, other user input devices such as trackballs, writing tablets, pressure pads, microphones, light pens and position-sensing screen displays may be connected to user interface 335. Examples of the display device 370 include cathode-ray tubes (CRT) and liquid crystal displays (LCD).

A machine readable computer program may be created by one of skill in the art and stored in computer system 300 or a data and/or any one or more of machine readable medium 375 to simplify the practicing of this disclosure. In operation, information for the computer program created to run the present disclosure is loaded on the appropriate removable data and/or program storage device 355, fed through data port 345, or entered using keyboard 365. A user controls the program by manipulating functions performed by the computer program and providing other data inputs via any of the above mentioned data input means. The display device 370 provides a way for the user to accurately control the computer program and perform the desired tasks described herein.

Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

While shown and described herein as a method and system for performing an OPC process which incorporates a CD correction of a structure, it is understood that the disclosure further provides various alternative embodiments. For example, in an embodiment, the disclosure provides a program product stored on a computer-readable medium, which when executed, enables a computer infrastructure to perform an OPC process which incorporates a CD correction of a structure. To this extent, the computer-readable medium includes program code, such as data correction tool 100 (FIG. 1), which implements the process described herein. It is understood that the term "computer-readable medium" comprises one or more of any type of physical embodiment of the program code.

It should be appreciated that the teachings of the present disclosure could be offered as a business method on a subscription or fee basis. For example, a computer system 300 (FIG. 5) comprising data correction tool 100 (FIG. 1) could be created, maintained and/or deployed by a service provider that offers the functions described herein for customers. That is, a service provider could offer to provide a service to performing an OPC process that incorporates a CD correction of a structure.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the terms "component" and "system" are synonymous as used herein and represent any combination of hardware and/or software capable of performing some function(s).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the disclosure has other applications in other environments. This application is intended to cover any adaptations or variations of the present disclosure. The following claims are in no way intended to limit the scope of the disclosure to the specific embodiments described herein.

It is apparent that there has been provided by this invention an approach for performing data correction operation on an IC layout accommodating compensation for CD variations. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for performing an optical proximity correction (OPC) process on a layout by incorporating a critical dimension (CD) correction of a structure therein, the layout requiring double exposures in fabrication, the method comprising:

separating the layout into a first portion and a second portion corresponding to the two exposures using a computer;

creating a model for calculating a CD correction for a site on the first portion, the model corresponding to a topography change on the site due to the double exposures;

implementing an OPC iteration for the site based on the model to generate an OPC solution for the first portion using the computer;

combining the OPC solution for the first portion with an OPC solution for the second portion to generate an OPC solution for the layout to generate a mask for fabricating a structure using the layout using the computer;

designing a multiple levels OPC test structure and sampling plan corresponding to multiple sources of CD changes using the computer; and detecting a CD change under each level of the multiple levels OPC test structure and sampling plan using the computer.

2. The method according to claim 1, wherein the double exposures require two photoresists intersecting one another, and the model creating includes creating a model corresponding to a topography change due to a thickness of the photoresist for the exposure of the first portion.

3. The method of claim 2, wherein the model creating includes detecting a CD change due to the photoresist thickness.

4. The method according to claim 1, wherein the model creating includes creating a model corresponding to a focus condition for the exposure of the first portion.

5. The method of claim 4, wherein the model creating includes detecting a CD change due to the focus condition.

6. The method according to claim 1, wherein the structure includes at least two layers, the first portion corresponding to a first layer and the second portion corresponding to a second different layer including a topography to be formed immediately below the first layer.

7. A system comprising:

at least one computing device configured to perform an optical proximity correction (OPC) process on a layout by incorporating a critical dimension (CD) correction of a structure therein, the layout requiring double exposures in fabrication by performing the method comprising:

separating the layout into a first portion and a second portion corresponding to the two exposures;

creating a model for calculating a CD correction for a site on the first portion, the model corresponding to a topography change on the site due to the double exposures;

implementing an OPC iteration for the site based on the model to generate an OPC solution for the first portion;

combining the OPC solution for the first portion with an OPC solution for the second portion to generate an OPC solution for the layout to generate a mask for fabricating a structure using the layout;

designing a multiple levels OPC test structure and sampling plan corresponding to multiple sources of CD changes; and detecting a CD change under each level of the multiple levels OPC test structure and sampling plan.

8. The system of claim 7, wherein the double exposures require two photoresists intersecting one another, and the creating a model creates a model corresponding to a topography change due to a thickness of the photoresist for the exposure of the first portion.

9. The system of claim 8, wherein the creating a model detects a CD change due to the photoresist thickness.

10. The system of claim 7, wherein the creating a model creates a model corresponding to a focus condition for the exposure of the first portion.

11. The system of claim 10, wherein the creating a model detects a CD change due to the focus condition.

12. The system of claim 7, wherein the structure includes at least two layers, the first portion corresponding to a first layer and the second portion corresponding to a second different layer including a topography to be formed immediately below the first layer.

13. A program product stored on a non-transitory computer-readable medium, which when executed by a computer system, performs an optical proximity correction (OPC) process on a layout by incorporating a critical dimension (CD) correction of a structure therein, the layout requiring double exposures in fabrication, the program product performing the following process:

separating the layout into a first portion and a second portion corresponding to the two exposures;

creating a model for calculating a CD correction for a site on the first portion, the model corresponding to a topography change on the site due to the double exposures;

implementing an OPC iteration for the site based on the model to generate an OPC solution for the first portion;

combining the OPC solution for the first portion with an OPC solution for the second portion to generate an OPC solution for the layout to generate a mask for fabricating a structure using the layout;

designing a multiple levels OPC test structure and sampling plan corresponding to multiple sources of CD changes; and detecting a CD change under each level of the multiple levels OPC test structure and sampling plan.

14. The program product of claim 13, wherein the double exposures require two photoresists intersecting one another, and the model creating includes creating a model corresponding to a topography change due to a thickness of the photoresist for the exposure of the first portion.

15. The program product of claim 14, wherein the model creating includes detecting a CD change due to the photoresist thickness.

16. The program product of claim 13, wherein the model creating includes creating a model corresponding to a focus condition for the exposure of the first portion.

17. The program product of claim 16, wherein the model creating includes detecting a CD change due to the focus condition.

\* \* \* \* \*